United States Patent [19]
Nishiura

[11] Patent Number: 5,188,789
[45] Date of Patent: Feb. 23, 1993

[54] PRODUCING A PHOTOGRAPHIC SUPPORT
[75] Inventor: Yosuke Nishiura, Kanagawa, Japan
[73] Assignee: Fuji Photo Film Co., Ltd., Kanagawa, Japan
[21] Appl. No.: 759,290
[22] Filed: Sep. 13, 1991
[30] Foreign Application Priority Data
 Sep. 14, 1990 [JP] Japan .................. 2-245227
[51] Int. Cl.$^5$ .............................................. B29C 47/06
[52] U.S. Cl. ..................... 264/171; 118/411;
   264/211.11; 264/217; 425/462; 427/128;
   427/131; 427/284; 427/420
[58] Field of Search .......... 264/171, 211.11, 212,
   264/245, 216-218; 427/420, 128, 131, 284;
   118/410, 411, 419; 425/461, 462

[56] References Cited
U.S. PATENT DOCUMENTS

| 3,032,008 | 5/1962 | Land et al. | 118/411 |
| 4,297,396 | 10/1981 | Takehara et al. | 427/284 |
| 4,324,816 | 4/1982 | Landis et al. | 118/411 |
| 4,469,782 | 9/1984 | Ishiwata et al. | 118/411 |
| 4,592,885 | 6/1986 | Ichino et al. | 425/131.1 |

FOREIGN PATENT DOCUMENTS

| 61-94724 | 10/1984 | Japan . |
| 61-94725 | 10/1984 | Japan . |
| 61-148013 | 12/1984 | Japan . |
| 61-158413 | 12/1984 | Japan . |
| 509447 | 6/1976 | U.S.S.R. | 118/411 |

Primary Examiner—Jeffery Thurlow
Attorney, Agent, or Firm—Sughrue, Mion, Zinn, Macpeak & Seas

[57] ABSTRACT

A support for a silver halide photographic material is described as being produced by a process including co-extruding plural dope liquids through a co-flow-extending die having plural manifolds, wherein slits having a comb-like cross section connect at least one of the manifolds to a liquid joining portion of the die. The photographic support can have a magnetic recording layer exhibiting excellent magnetic recording and reproducing characteristics and having excellent flatness.

6 Claims, 3 Drawing Sheets

PRODUCING A PHOTOGRAPHIC SUPPORT

FIELD OF THE INVENTION

The present invention relates to a support for a silver halide photographic material, and more particularly to a photographic support having a magnetic recording layer exhibiting excellent magnetic recording and reproducing characteristics and having excellent flatness.

BACKGROUND OF THE INVENTION

Previously, in a silver halide photographic material (hereinafter referred to as a photographic light-sensitive material or a photographic material), it has been possible to store the photographing conditions, such as the date and hour and the weather at photographing, the ratio of reduction/magnification, and the conditions at development and printing, such as the number of reprints, portions being zoomed, messages, etc., in the photographic light-sensitive material by forming a magnetic recording layer on a color negative photographic film and inputting magnetic recording signals in a camera or a photographic laboratory, and to transport these conditions to picture and image devices such as television, video tape recorder, etc, as disclosed in WO Nos. 90-4205 and 90-04212.

However, in the case of a photographic light-sensitive material having a transparent magnetic recording layer within the image-forming portions as disclosed in the foregoing WO patents and U.S. Pat. No. 3,782,947, it is necessary to reduce the content of the magnetic recording material to be as small as possible to minimize the reduction of the photographic sensitivity resulting from absorption by the magnetic recording material and the influences of haze on photographic properties. If the content of the magnetic recording material is reduced, though, a problem arises such that the magnetic output characteristics become insufficient. Furthermore, a problem occurs in that while making the magnetic record within the photographed images, the images are scratched by rubbing the photographed images with a magnetic head.

As one alternative for solving these problems, there is a method of placing a magnetic recording layer outside of the images as a stripe form, as conventionally used for a sound track for cinephotographic films. However, the existing photographic light-sensitive material having 135 format (35 mm size) has perforations at both edge sides of the film, and there are no spaces for placing a magnetic recording layer. Thus, the foregoing WO patents propose a one-side perforation type film. However, even in this case, the space for placing a magnetic recording layer is narrow.

To provide the maximum recording density in such a narrow space, it is necessary to form a uniform magnetic recording layer in the width direction. In particular, the uniformity is necessary in the case of obtaining input and output performance having no dispersion for each magnetic head by utilizing the magnetic recording layer from one end to the other in the width direction using multi-channel heads.

However, with conventional stripe coating as shown, for example, in JP-A-50-138037 and JP-A-49-42343 (the term "JP-A" as used herein means an "unexamined published Japanese patent application"), problems arise in that the sectional thickness of the stripe layer differs between both the edge portions, or the cross section of the stripe layer does not form a rectangle. Also, it is difficult to independently select the width and the thickness of the stripe layer, and the coated width is widened. Thus, in the foregoing case, uniform input and output performance is not obtained when using multi-channel heads. The poor performance results not only from the difference in the amount of the magnetic recording material corresponding to each track for each magnetic head, but also from the influence of the space loss caused by the formation of a space between the magnetic head and the magnetic recording layer. In particular, the space loss suddenly increases when the recording density increases.

Also, when a photographic film having a stripe coating of a magnetic recording material is used in the form of a roll of a long film or by being wound in a cartridge, problems arise in that the stripe layer closely adheres to the surface of the emulsion layer of the film, a gap or loosening of the wound roll occurs, and the corners of the stripe layer collapse.

SUMMARY OF THE INVENTION

An object of the present invention is to provide a silver halide photographic material having magnetic recording layers which do not have a bad influence on the optical photographic property of the photographic material and which show excellent magnetic characteristics.

Another object of the present invention is to provide a silver halide photographic material having magnetic recording layers disposed in stripe form, each stripe magnetic recording layer having uniform magnetic input and output characteristics in the width direction.

Another object of this invention is to provide a silver halide photographic material having magnetic recording layers dispersed in stripe form without having differences in the thickness thereof in the width direction of the photographic material, each stripe magnetic recording layer having a good flatness.

Another object of this invention is to provide a silver halide photographic material in which the magnetic recording layer does not adhere to the photosensitive emulsion layer, and in which there is no winding gap in the case of winding the photographic material in a roll form.

Another object of the present invention is to provide a photographic support having stripe layers of a magnetic recording material for the foregoing silver halide photographic material.

Another object of the present invention is to provide a process of producing a photographic support having stripe layers of a magnetic recording material, the support being for the foregoing silver halide photographic material.

It has now been discovered that the foregoing objects can be attained by a process including co-extruding plural dope liquids through a co-flow-extending die having plural manifolds, wherein slits having a comb-like cross section connect at least one of the manifolds to a liquid joining portion, of the die. In a particular embodiment, the foregoing objects can be attained by a film-forming process for a photographic support using a co-flow-extending die having plural manifolds capable of co-flow-extending stripes having essentially no difference in level or thickness, the cross sectional form of the slits of one or two manifolds being formed in a comb-like form such that when the cross sectional form of the slits of two manifolds is in a comb-like form, openings of the comb-like slits are joined such that the openings of the slits are alternately disposed. The liquid joining portion may be present at a upper lip side or a under lip side, with the under lip side being preferred.

DETAILED DESCRIPTION OF THE INVENTION

Systems of applying a magnetic recording material to a support include a system of coating a coating composition containing a magnetic recording material on a support and a system of dispersing or kneading a magnetic recording material in or with a material constituting a support, such that the support is obtained by directly forming a film with the dispersion or the kneaded mixture.

In the latter case, the film-forming method includes a melt extrusion method and a solution casting method and is selected according to the nature of the material for the support. For example, in the case of using cellulose triacetate, etc., as a support, a so-called flow-extending system is used such that a high-viscous solution (dope) obtained by dissolving cellulose triacetate in a solvent such as methylene chloride is extruded onto a band, followed by drying to form a film.

In this invention, a sample is obtained by forming film co-flow-extending by the foregoing flow-extending system simultaneously using at least two kinds of dope liquids such as dope liquid(s) containing the foregoing magnetic recording material and a dope liquid containing no magnetic recording material, wherein the dope liquid(s) containing the magnetic recording material are flow-extended to form stripe form films having essentially no difference in level or thickness in the width direction.

The polymer materials which are used for the plural co-flow-extending dope liquids may be the same material or may be different materials. In this case, however, it is desirable that the ratio of the shearing viscosities of the dope liquids in the slits is near 1, so that each stripe which is formed will be sharp.

Since the magnetic recording layers obtained by the process of this invention as described above are stripe form layers having no difference in the level of the surface in the width direction of the support, the photographic support gives a photographic light-sensitive material having the features that both the magnetic characteristics and photographic properties are good and the problems of the magnetic recording layer adhering to the photosensitive emulsion layer and the presence of a winding gap do not occur. Furthermore, the magnetic recording layers in this invention have good abrasion resistance to magnetic heads.

The invention is explained below in more detail.

Figure 1:
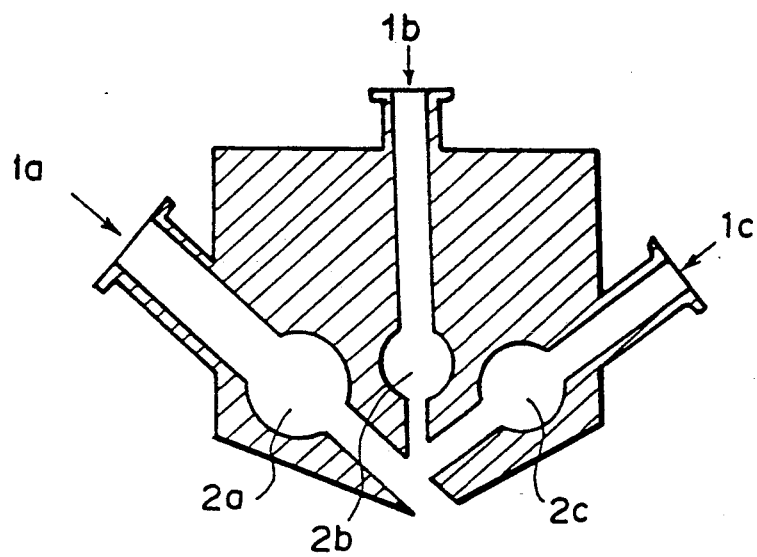
FIG. 1 is a cross sectional view of a co-flow-extending die, which is used for the production of the photographic support of this invention, in the plane perpendicular to the width direction of the die.
Figure 2:
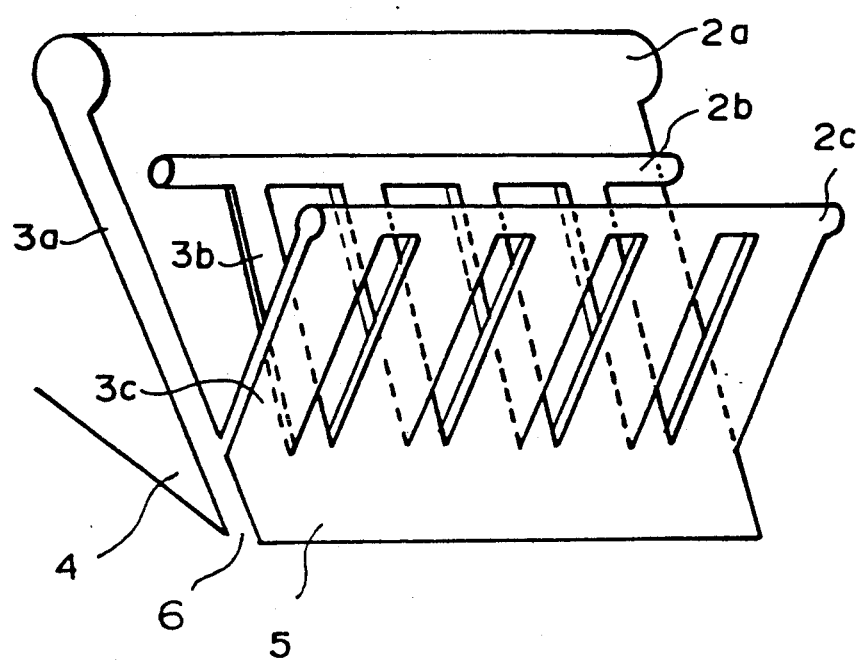
FIG. 2 is a schematic slant view of the downstream sides of the manifolds of the die.

An embodiment of the co-flow-extending die which is used for practicing the process of this invention is shown in FIG. 1 (the cross sectional view of the die in the width direction for the flow-extending and FIG. 2 (the slant view of the downstream portions of the manifolds of the die).

Dope a (1a) is flow-extended in the whole width through a manifold (2a) and slit (3a) at the downstream side of the manifold (2a), and dope b (1b) and dope (1c) are joined together with the dope through a manifold 2b and a manifold 2c, respectively, and comb-like slits 3b and 3c, such that dope b and dope c are alternatively flow-extended to complete a film in the width direction. Dope a and dope c each are a polymer solution containing no magnetic recording material and are mainly composed of a cellulose ester such as, particularly preferably, triacetyl cellulose, and, in particular, dope c can contain an antistatic agent, a lubricant, a scratch resistance improving agent, etc.

Dope b contains a magnetic recording material.

The liquid sending system (1c, 2c, and 3c) for may be omitted. In this case, the spaces among the stripes of dope b are filled with dope a in the slit 3a.

Furthermore, in FIG. 2, 4 represents an under lip side, 5 represents an upper lip side, and 6 represents a lip.

Embodiments of the process according to the present invention are as follows:

(1) A process for producing a photographic support in a stripe co-flow-extending die, comprising co-extruding plural dope liquids through a co-flow-extending die having plural manifolds, wherein the cross section of at least one slit directing to a liquid joining portion of the die is a comb-like form.

(2) A process for producing a photographic support as in (1) above, wherein in the plural manifolds, a comb-like slit which is connected to a subordinate manifold joins between a main manifold and a lip.

(3) A process for producing a photographic support as in (1) above, which comprising sending a dope liquid containing a cellulose ester through a main manifold and sending a dope liquid containing a magnetic substance through a subordinate manifold.

(4) A process for producing a photographic support as in (1) above, wherein in the plural manifolds, comb-like slits in a subordinate manifold are not disposed at both ends in a width direction (FIG. 2).

(5) A process for producing a photographic support comprising co-extruding plural liquids through a co-flow-extending having at least three manifolds, wherein in the manifolds, two manifolds adjacent to each other are subordinate manifolds and have slits arranged in a comb-like cross section, and the comb-like slits join alternatively with each other to complete extended layers from the two manifolds.

(6) A process for producing a photographic support as in (5) above, wherein in the manifolds, the subordinate manifolds each connected to slits of comb-like cross section joins between a main manifold and a lip.

(7) A process for producing a photographic support as in (5) above, which comprises sending a dope liquid containing a cellulose ester through a main manifold and sending a dope liquid containing a magnetic substance through only one of the subordinate manifolds.

(8) A process for producing a photographic support as in (5) above, in the subordinate manifolds, the comb-like slits of one of the manifolds send a dope liquid containing a magnetic substance and are not disposed at both ends in a width direction.

A ferromagnetic iron oxide fine powder, a Co-containing ferromagnetic iron oxide fine powder, a ferromagnetic chromium dioxide fine powder, a ferromagnetic metal fine powder, a ferromagnetic alloy fine powder, a barium ferrite fine powder, etc, can be used as the magnetic recording material for use in this invention.

An example of the ferromagnetic alloy fine powder is one containing a metal component in an amount of at least 75% by weight, with at least 80% by weight of the metal component being at least one kind of a ferromagnetic metal or alloy (e.g., Fe, Co, Ni, Fe-Co, Fe-Ni, Co-Ni, Co-Fe-Ni) and containing other components (e.g., Al, Si, S, Se, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi) in an amount of not more than 20% by weight (based on the metal component). Also, the foregoing ferromagnetic metal component may contain a small amount of water, a hydroxide, or an oxide.

The production processes of these ferromagnetic powders are known, and the ferromagnetic powder for use in this invention can be produced according to a known process.

There are no particular restrictions on the sizes and the forms of the ferromagnetic powder for use in this invention. As the form of the ferromagnetic powder, a needle-like form, a rice grain form, a spherical form, a cubic form, a tabular form, etc., may be used, but a needle-like form or a tabular form is preferred for the electromagnetic conversion characteristics.

There are also no particular restrictions on the crystallite sizes and the specific areas of the ferromagnetic powder, but the crystallite size of the ferromagnetic powder for use in this invention is generally not larger than 400 Å and the specific area is preferably at least 20 $m^2/g$, and particularly preferably at least 30 $m^2/g$ as $S_{BEST}$.

The ferromagnetic powder can be used without particular restriction on the pH and surface treatment in this invention (for example, the ferromagnetic powder may be surface treated with a material containing an element such as titanium, silicon, aluminum, etc., or it may be treated with carboxylic acid, sulfonic acid, a sulfuric acid ester, phosphonic acid, a phosphoric acid ester, or an organic acid such as an absorptive compound having a nitrogen-containing heterocyclic ring, such as benzotriazole, etc.). However, a preferred pH range of the ferromagnetic powder for use in this invention is from 5 to 10.

When the ferromagnetic powder is a ferromagnetic iron oxide fine powder, it can be used without any particular restriction on the ratio of divalent iron/trivalent iron.

Semi-synthetic or synthetic polymers such as cellulose esters (particularly, cellulose triacetate, cellulose diacetate, cellulose propionate, cellulose acetate propionate, cellulose butyrate, and cellulose acetate butyrate), polyamide, polycarbonate, polystyrene, polysulfone, polyether sulfone, polyarylate, polyphenylene oxide, etc., can be used as the material for the support which is used in this invention. If necessary a blend of these compounds may be used. For this invention, cellulose triacetate, cellulose acetate butyrate, and polycarbonate are preferred. Further, cellulose triacetate is particularly preferred.

The foregoing polymers can have a molecular weight of at least 10,000, but usually polymers having a molecular weight of from 20,000 to 800,000 are used.

The support of this invention may contain a plasticizer for the purpose of imparting flexibility, etc., to the support. In the case of using cellulose esters as the support material, a plasticizer such as triphenyl phosphate, biphenyldiphenyl phosphate, dimethylethyl phosphate, etc., can be used.

The support of this invention may further contain a dye for the neutralization of view (or for the same absorption of light at all visible wave length) in a base color, the prevention of light piping, the prevention of halation, etc.

The solvent for forming a dope of the foregoing polymer differs according to each polymer employed. For example, in the case of cellulose triacetate, a mixed solvent of methylene chloride, methanol and, if necessary, butanol or another solvent is used. The concentration of cellulose triacetate in the dope is from 8 to 27% and the ratio of methylene chloride/methanol is from about 97/3 to 80/20.

The dope liquid of cellulose triacetate is prepared by dissolving cellulose triacetate in a solvent. In the case of the dope liquid containing a magnetic recording material, a ferromagnetic substance is previously dispersed in the cellulose triacetate using an ordinary dispersing means such as a sand mill, and then the dispersion is mixed with a solvent.

There is no particular restriction on the thickness of the layer containing the magnetic recording material, but the thickness is preferably not thicker than 15 $\mu$m, and more preferably not thicker than 10 $\mu$m. The amount of the magnetic recording material contained in the layer is usually from 0.01 $g/m^2$ to 10 $g/m^2$.

The thickness of the layer containing no magnetic recording material is from 50 $\mu$m to 300 $\mu$m.

The magnetic recording layers may be provided with functions such as an improvement in lubricity, curling control, static prevention, sticking prevention, scratch resistance, etc., or other functional layers can be formed thereon to provide these functions.

Also, the support obtained can be subjected to a calendering treatment to improve the smoothness thereof. After applying an ordinary surface treatment (e.g., a chemical treatment, a mechanical treatment, a corona discharge treatment, a high frequency treatment, a glow discharge treatment, an active plasma treatment, a laser treatment, a mixed acid treatment, and an ozone oxidation treatment) to the surface of the support opposite to the surface having the magnetic recording layers or without applying such a surface treatment, a subbing layer can be formed thereon, and photographic emulsion layer(s) can be coated on the subbing layer.

Color photographic reversal film and color photographic negative film are typical examples of the silver halide photographic material using the photographic support of this invention.

The invention is explained in further detail below using a general color photographic negative film.

The color photographic light-sensitive material in this invention may have on the support at least one blue-sensitive silver halide emulsion layer, at least one green-sensitive silver halide emulsion layer, and at least one red-sensitive silver halide emulsion layer. There are no particular restrictions on the number of the silver halide emulsion layers and light-insensitive layers, nor are there any particular restrictions on the order of the silver halide emulsion layers.

A typical example of the silver halide color photographic material is a color photographic material having on a support at least one photosensitive layer composed of plural silver halide emulsion layers each having substantially the same color sensitivity but having a different light sensitivity. The photosensitive layer is a unit photosensitive layer having a color sensitivity to one of blue light, green light, and red light, and in a multilayer silver halide color photographic material, the unit photosensitive layers are generally arranged from the support side in the order of a red-sensitive layer, a green-sensitive layer, and a blue-sensitive layer. However, according to the purpose, other arrangements of the unit photosensitive layers may be employed, or an order in which a different photosensitive layer is inserted between two layers of the same color sensitivity may be employed.

Also, between the foregoing silver halide photosensitive emulsion layers, or as the top layer or the bottom layer, light-insensitive layers such as an interlayer, a protective layer, a subbing layer, etc., may be formed.

The interlayer may contain couplers, the DIR compounds as described in JP-A-61-43748, JP-A-59-113438, JP-A-59-113440, JP-A-61-20037, and JP-A-61-20038, or a color mixing inhibitor as is usually used.

The plural silver halide emulsion layers constituting each unit photosensitive layer are described in West German Pat. No. 1,121,470, British Pat. No. 923,045, JP-A-57-112751, JP-A-62-200350, JP-A-62-206541, JP-A-62-206543, JP-A-56-25738, JP-A-62-63936, and JP-A-59-202464, JP-B-55-34932 and JP-B-49-15495 (the term "JP-B" as used herein means an "examined published Japanese patent application").

The silver halide grains for use in this invention may have a regular crystal form such as cubic, octahedral, tetradecahedral, etc., an irregular crystal form such as spherical, tabular, etc., a crystal form having a crystal defect such as twin planes, etc., or a composite form of these crystal forms.

The silver halide grains may be fine grains of a size not larger than about 0.2 μm or large grains of up to about 10 μm in the diameter of the projected area.

The silver halide emulsion for use in this invention may be a polydisperse emulsion or a mono-disperse emulsion. The silver halide photographic emulsions for use in this invention can be prepared by the methods described, e.g., in Research Disclosure (RD), No. 17643, pages 22-23, "I. Emulsion Preparation and Types" (Dec., 1978); ibid., No. 18716, page 648 (Nov., 1979); P. Glafkides, Chimie et Phisique Photoqraphique, published by Paul Montel, 1967; G.F. Duffin, Photoqraphic Emulsion Chemistry, published by Focal Press, 1966; and V.L. Zelikman et al, Making and Coating Photographic Emulsion, published by Focal Press, 1964.

Also, the monodisperse emulsions described in U.S. Pat. Nos. 3,574,628 and 3,655,394 and British Pat. No. 1,413,748 can be preferably used in this invention.

Furthermore, tabular silver halide grains having an aspect ratio of at least 5 can be used in this invention. Tabular silver halide grains can be easily prepared by the methods described in Gutoff, Photographic Science and Engineering, Vol. 14, pages 248-257 (1970), U.S. Pat. Nos. 4,434,226, 4,414,310, 4,433,048, and 4,439,520, and British Pat. No. 2,112,157.

The crystal structure of the silver halide grains may be uniform throughout the grain, it may be composed of a different halogen composition between the inside and the outside portions of the grain, or it may be a layer structure. Also, a silver halide having a different composition may be attached by an epitaxial junction, or the silver halide grains may be bonded to compounds other than silver halide, such as silver rhodanide, lead oxide, etc.

Also, a mixture of silver halide grains having various crystal forms may be used.

The silver halide emulsion is usually physically ripened, chemically ripened, and spectrally sensitized. The effect of this invention is particularly remarkable in the case of using a silver halide emulsion sensitized with a gold compound and a sulfur-containing compound.

Additives which are used in these steps are described in Research Disclosure, No. 17643, and ibid., No. 18716, and the corresponding portions are summarized in the following table.

Known photographic additives which can be used in this invention are also described in the foregoing two publications, and the related portions are shown in the following table.

| Additive | RD 17643 | RD 18716 |
|---|---|---|
| 1. Chemical Sensitizer | Page 23 | Page 648, right column |
| 2. Sensitivity Increasing Agent | | Page 648, right column |
| 3. Spectral Sensitizer Super Color Sensitizer | Pages 23 to 24 | Page 648, right column to page 649, right column |
| 4. Whitening Agent | Page 24 | |
| 5. Antifoggant and Stabilizer | Pages 24 to 25 | Page 649, right column |
| 6. Light-Absorbent, Filter Dye, Ultraviolet Absorbent | Pages 25 to 26 | Page 649, right column to page 650, left column |
| 7. Stain Inhibitor | Page 25, right column | Page 650, left column to right column |
| 8. Dye Image Stabilizer | Page 25 | |
| 9. Hardening Agent | Page 26 | Page 651, left column |
| 10. Binder | Page 26 | Page 651, left column |
| 11. Plasticizer, Lubricant | Page 27 | Page 650, right column |
| 12. Coating Aid, Surface Active Agent | Pages 26 to 27 | Page 650, right column |

Also, to prevent the deterioration of photographic performance with a formaldehyde gas, it is preferred to add a compound capable of reacting formaldehyde to fix it to the color photographic light-sensitive material, as described in U.S. Pat. Nos. 4,411,987 and 4,435,503.

Various color couplers can be used for the color photographic light-sensitive material using the photographic support of this invention. Suitable examples of the color couplers are disclosed in the patents described in Research Disclosure, No. 17643, VII-C to G.

Preferred examples of yellow couplers are described in U.S. Pat. Nos. 3,933,501, 4,022,620, 4,326,024, 4,401,752, 4,248,961, 3,973,968 and 4,314,023, JP-B-58-10739, British Pat. Nos. 1,425,020 and 1,476,760, and European Pat. No. 249,473A.

As magenta couplers, 5-pyrazolone series compounds and pyrazoloazole series compounds are preferred, and particularly preferred examples of the magenta couplers are described in U.S. Pat. Nos. 4,310,619, 4,351,897, 3,061,432, 3,725,067, European Pat. No. 73,636, *Research Disclosure*, No. 24220 (Jun., 1984), *ibid.*, No. 24230 (Jun., 1984), JP-A-60-33552, JP-A-60-43659, JP-A-61-72238, JP-A-60-35730, JP-A-55-118034, and JP-A-60-185951, U.S. Pat. Nos. 4,500,630, 4,540,654, and 4,556,630, and WO (PCT) 88/04795.

Phenolic and naphtholic couplers may be used as cyan couplers, and preferred examples thereof are described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, 4,327,173, West German Pat. Publication (OLS) 3,329,729, European Pat. Nos. 121,365A and 249,453A, U.S. Pat. Nos. 3,446,622, 4,333,999, 4,753,871, 4,451,559, 4,427,767, 4,690,889, 4,254,212, and 4,296,199, and JP-A-61-42658.

Also, in this invention, colored couplers for correcting unnecessary absorptions of colored dyes can be used, and preferred examples of such colored couplers are described in *Research Disclosure*, No. 17643, VII-G, U.S. Pat. Nos. 4,163,670, 4,004,929 and 4,138,258, JP-B-57-39413, and British Pat. No. 1,146,368.

In this invention, couplers forming colored dyes having a proper diffusibility can be used, and preferred British Pat. No. 2,125,570, European Pat. 96,570, and West German Pat. Publication (OLS) 3,234,533.

Also, in this invention, polymerized dye-forming couplers can be used. Typical examples of the polymerized coupler are described in U.S. Pat. Nos. 3,451,820, 4,080,211, 4,367,282, 4,409,320, and 4,576,910, and British Pat. No. 2,102,137.

Couplers releasing a photographically useful group upon coupling can be preferably used in this invention.

Preferred examples of a DIR coupler releasing a development inhibitor are described in *Research Disclosure*, No. 17643, Paragraph VII-F, JP-A-57-151944, JP-A-57-154234, JP-A-60-184248, and JP-A-63-37346, and U.S. Pat. 4,248,962.

Examples of couplers imagewise releasing a nucleating agent or a development accelerator at development are described in British Pat. Nos. 2,097,140 and 2,131,188, JP-A-59-157638, and JP-A-59-170840.

Also, the competing couplers described in U.S. Pat. No. 4,130,427, the polyequivalent couplers described in U.S. Pat. Nos. 4,283,472, 4,338,393, and 4,310,618, the DIR redox compound-releasing couplers, DIR coupler-releasing couplers, DIR coupler-releasing redox compounds, and DIR redox-releasing redox compounds described in JP-A-60-185950 and JP-A-62-24252, the couplers releasing a dye which is recolored after releasing as described in European Pat. No. 173,302A, the couplers releasing a bleach accelerator as described in *Research Disclosure*, No. 11449, *ibid.*, No. 24241, and JP-A-61-201247, the couplers releasing a ligand as described in U.S. Pat. No. 4,553,477, and the couplers releasing a leuco dye as described in JP-A-63-75747 are other couplers which can be used for the color photographic light-sensitive materials using the photographic support of this invention.

The couplers for use in this invention are introduced into the color photographic light-sensitive materials in this invention by various dispersion methods.

An oil drop-in-water dispersion method is one of the dispersion methods which can be used. Examples of a high-boiling solvent which can be used in the oil drop-in-water method are described in U.S. Pat. 2,322,027.

Also, typical examples of high-boiling organic solvents having a boiling point of at least 175° C. at normal pressure which are used for the oil drop-in-water dispersion method are phthalic acid esters, phosphoric acid esters, phosphonic acid esters, benzoic acid esters, amides, alcohols, phenols, aliphatic carboxylic acid esters, aniline derivatives, and hydrocarbons.

Also, in the foregoing method, a low-boiling organic solvent having a boiling point of at least about 30° C., and preferably from about 50° C. to 160° C., can be used as an auxiliary solvent. Typical examples of low-boiling solvents are ethyl acetate, butyl acetate, ethyl propionate, methyl ethyl ketone, cyclohexanone, 2-ethoxyethyl acetate, and dimethylformamide.

The couplers can be also introduced into the color photographic materials by a latex dispersion method. Suitable examples of the step and effect of the latex dispersion method and suitable examples of latexes for impregnation are described in U.S. Pat. No. 4,199,364 and West German Patent Publications (OLS) 2,541,274 and 2,541,230.

It is preferred that the combined thickness of all of the hydrophilic colloid layers on the emulsion layer-carrying side of the color photographic material in this invention is not greater than 28 μm and that the film swelling speed $T\frac{1}{2}$ is not faster than 30 seconds.

The layer thickness means the thickness of the layers measured after 2 days at 25° C. and a relative humidity of 55%, and the film swelling speed $T\frac{1}{2}$ can be measured by a known method in the field of the art. For example, the swelling speed can be measured by using a swellometer of the type described in A. Green, *Photographic Science and Engineering*, Vol. 19, No. 2, pages 124–129.

$T\frac{1}{2}$ is defined as follows. 90% of the maximum swelled layer thickness reached in the case of processing a color photographic light-sensitive material with a color developer at 30° C. for 3 minutes and 15 seconds is defined as the saturated layer thickness, and the time required to reach $\frac{1}{2}$ of the saturated layer thickness is defined as $T\frac{1}{2}$.

The layer swelling speed $T\frac{1}{2}$ can be controlled by adding a hardening agent to gelatin as a binder or by changing conditions with time after coating.

Also, the swelling ratio is preferably from 150% to 400%.

The swelling ratio can be calculated from the maximum swelled layer thickness under the foregoing condition according to the following equation:

Swelling ratio $= (A - B)/B$

A: Maximum swelled layer thickness;

B: Layer thickness

The color photographic light-sensitive material using the photographic support of this invention can be processed by an ordinary process as described in *Research Disclosure*, No. 17643, pages 28–29 and *ibid.*, No. 18716, page 615, left column to right column.

The silver halide color photographic material in this invention may contain a color developing agent therein for simplifying and quickening photographic processing. To incorporate a color developing agent in the color photographic material, it is preferable to use a precursor of the color developing agent. For example, the indoaniline series compounds described in U.S. Pat. No. 3,342,597, the Schiff base type compounds described in U.S. Pat. 3,342,599, *Research Disclosure*, No.

14850, and *ibid.*, No. 15159, and the aldol compounds described in *Research Disclosure*, No. 13924, can be used as precursors.

A preferred embodiment of the color photographic light-sensitive material is a roll-form film, in that signals can be easily recorded on the magnetic recording layers of the film upon transferring the film in a camera or a printer. In the roll-form film, the area of one imaged frame is preferably from 350 mm$^2$ to 1200 mm$^2$. More practically, it is preferred that the number of the perforations per frame is less than that of a 135 (35 mm) format film. It is particularly preferable that the number of perforations per frame is less than 4.

The information can be optically recorded in the spaces, which can record magnetic information, by using a light-emitting element such as an LED, etc. It is preferable to record magnetic information and optical information together in the spaces. The magnetic recording format can preferably be the system disclosed in WO (OPI) 90/04205.

In the case of using the color photographic light-sensitive material in this invention as a roll form, it is preferred that the photographic material be contained in a cartridge. The most general type of cartridge is at present a cartridge (Patrone) for the 135 format. The cartridges described in JU-A-58-67329 and JU-A-58-195236 (the term "JU-A" as used herein means an "unexamined published Japanese Utility Model Application"), JP-A-58-181035, JP-A-58-182634, U.S. Pat. No. 4,221,479, Japanese Patent Application Nos. 63-183344, and 1-21862, JP-A-1-231045, JP-A-2-170156, JP-A-2-205843, JP-A-2-210346, JP-A-2-199451, JP-A-2-201441, JP-A-2-214853, JP-A-2-211443, JP-A-2-264248, JP-A-3-37646, JP-A-3-37645, JP-A-2-124564, U.S. Pat. Nos. 4,846,418, 4,848,693, and 4,832,275 can be also used in this invention.

Also, a cartridge having a means of controlling the position of the cartridge in a camera described in Japanese Pat. Application No. 1-214895 is particularly preferably used in this invention.

The cartridge for use in this invention is mainly composed of a synthetic plastic.

The plastic forming the cartridge may contain, if necessary, a plasticizer. Typical examples of the plasticizer are trioctyl phosphate, tributyl phosphate, dibutyl phthalate, diethyl sebacate, methyl amyl ketone, nitrobenzene, γ-valerolactone, di-n-octyl succinate, bromonaphthalene, and butyl palmitate.

Specific examples of the plastics for forming the cartridge in this invention are set forth below, but the plastics are not limited to them.

That is, polystyrene, polyethylene, polypropylene, polymonochlorotrifluoroethylene, vinylidene chloride resins, vinyl chloride resins, vinyl chloride-vinyl acetate copolymer resins, acrylonitrilebutadiene-styrene copolymer resins, methylmethacryl resins, vinylformal resins, vinyl butyral resins, polyethylene terephthalate, Teflon, nylon, phenol resins, melamine resins, etc, can be used in this invention.

Particularly preferred plastic materials in this invention are polystyrene, polyethylene, and polypropylene.

Furthermore, the cartridge in this invention may contain an antistatic agent. There is no particular restriction on the antistatic agent, but carbon black, metal oxide particles, nonionic surface agents, anionic surface active agents, cationic surface active agents, betaine surface active agents, nonionic polymers, anionic polymers, cationic polymers, and betaine polymers can be preferably used. Cartridges having an antistatic property are described in JP-A-1-312537 and JP-A-1-312538.

Usually, the cartridge is made by using a plastic having kneaded therein carbon black or another pigment for imparting a light-shielding property thereto.

Furthermore, the cartridge may be the size of a cartridge being used at present, but if the diameter of the cartridge, which is 25 mm at present, is reduced to 22 mm or less, and preferably from 14 mm to 20 mm, the cartridge is effective for reducing the size of a camera. Also, in the cartridge being used at present, the extension end of a spool projects from one end of the cartridge at the side connecting to the film driving portion in a camera; since the projection becomes an obstacle to reducing the camera size, it is preferred to remove the projected portion, which results in reducing the cartridge volume, which at present is 35 cm$^2$. The volume of the cartridge case is preferably 30 cm$^2$ or smaller, more preferably 25 cm$^2$ or smaller, and particularly preferably 20 cm$^2$ or smaller.

The weight of the plastic used to make the cartridge is from 1 g to 25 g, and preferably from 5 g to 15 g.

The ratio of the inside volume of the cartridge case and the weight of the plastic being used for the cartridge and the cartridge case is from 4 to 0.7 cm$^3$/g, and preferably from 3 to 1 cm$^3$/g.

In the case of a cartridge containing a 135 color photographic film according to this invention, the total weight of the plastic being used for the cartridge and the cartridge case is usually from 1 g to 25 g, and preferably from 5 g to 15 g.

The form of the cartridge containing the color photographic light-sensitive material in this invention is explained in further detail below.

There is no particular restriction on the form of the cartridge in this invention, but it is preferred that the cartridge fits to cameras on the market. Furthermore, the cartridge containing the color photographic light-sensitive material in this invention may be used for a new camera.

Figure 3:
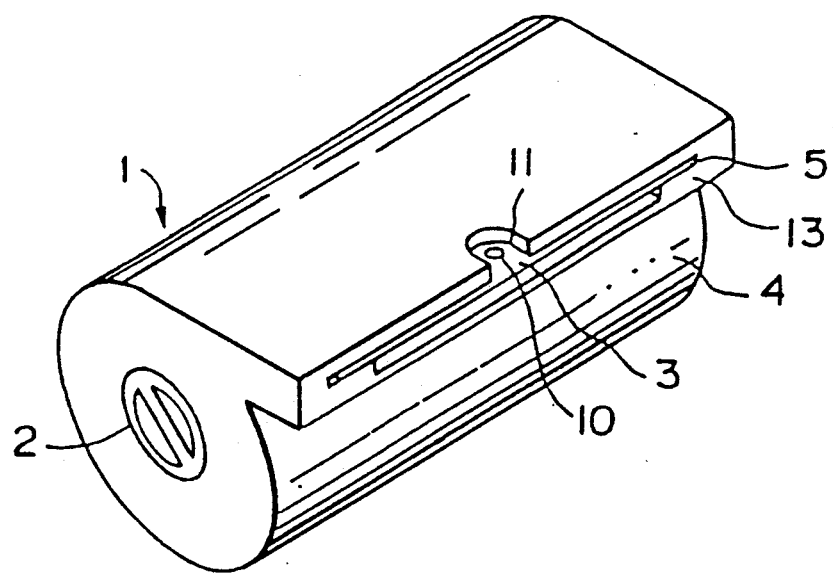
FIG. 3 is a slant view of a cartridge for photographic film having the photographic support of this invention.
Figure 4:
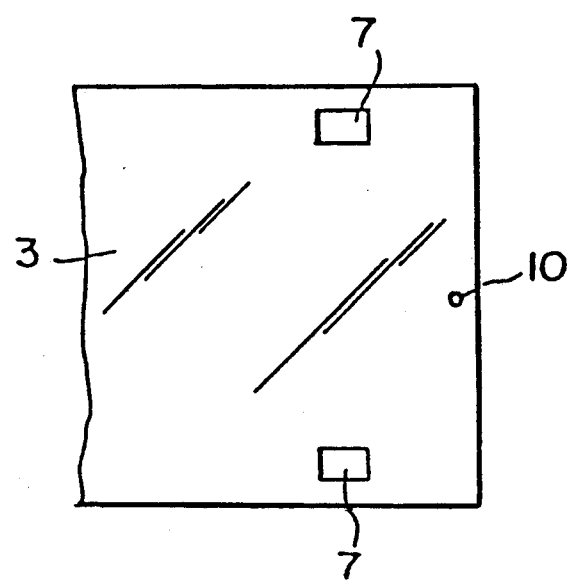
FIG. 4 is a plan view showing the state of the leading end portion of the photographic film using the photographic support of this invention
Figure 5:
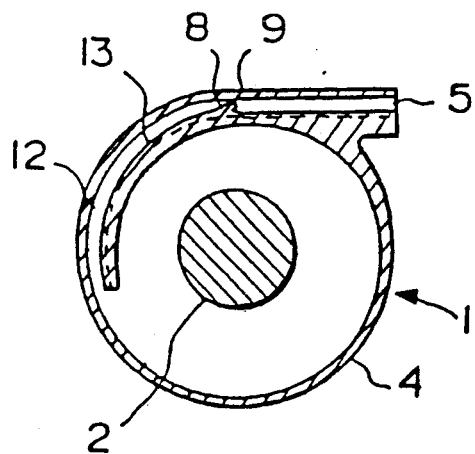
FIG. 5 is a cross sectional view of the cartridge shown in FIG. 3.
Figure 6:
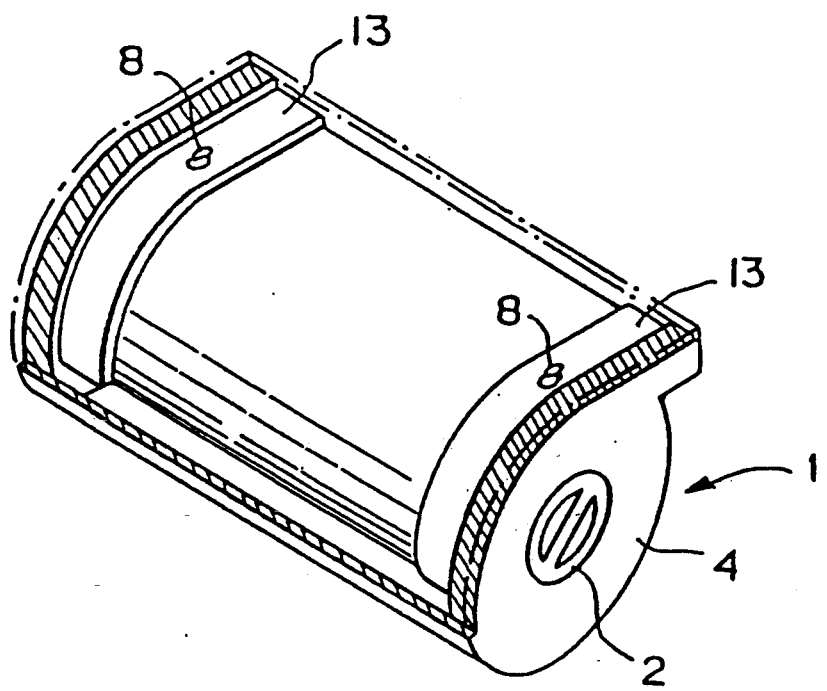
FIG. 6 is a partially cut-open view of the cartridge showing the inside thereof.

A suitable example of the cartridge is shown in FIG. 3 (the inside structures thereof are shown in FIG. 4 to FIG. 6) wherein 1 is a film cartridge, 2 is a spool, 3 is a film, 4 is a cartridge body, 5 is a leading edge, 7 is a perforation, 8 is a projection, 9 is a peak, 10 is a hole, 11 is a cutout, 12 is a film passageway, and 13 is a platform.

The invention is explained in further detail by the following examples, but the invention is not limited to these examples. All parts, percents, ratios, and the like are by weight unless stated otherwise.

EXAMPLE 1

Dope liquid (b) having the composition shown below was prepared by using a kneaded dispersion of Co-coated γ-ferric oxide (needle-like particles, specific area 38 m$^2$/g, Hc=800 Oe) in cellulose triacetate, and dope liquid (a) having the composition shown below and containing no ferromagnetic particles was prepared. Then, dope liquid (b) and dope liquid (a) were co-flow-extended on a band using a die like that shown in FIG. 1 and FIG. 2, except that the die had no system of extending dope liquid (c). The dope liquids were extended at dry layer thicknesses of 5 μm for dope liquid (b) and 110 μm for dope liquid (a), such that dope (a) formed the lower layer and dope liquid (b) formed stripe-form upper layers. In this case, the width of each stripe layer of dope (b) was 4 mm, and the interval between the stripes was 26 mm.

|  | Dope (b) (parts) | Dope (a) (parts) |
| --- | --- | --- |
| Cellulose Triacetate | 10.0 | 23.0 |
| Triphenyl Phosphate | 1.0 | 2.3 |
| Biphenyldiphenyl Phosphate | 0.6 | 1.3 |
| Co-coated γ-Ferric Oxide | 3.0 | — |
| Methylene Chloride | 76.1 | 65.7 |
| Methanol | 3.5 | 2.9 |
| n-Butanol | 5.8 | 4.8 |

On the other hand, a film of 110 μm in thickness was formed using the foregoing dope liquid (a) only, and on the film base thus formed was coated coating composition (c) having the composition shown below by using a stripe-type dip coater. Coating composition (c) was coated as stripe layers of a dry thickness of 5 μm, such that the width of each stripe became 4 mm and the interval between the stripes became 26 mm to provide a comparison support.

|  | Coating Composition (c) (parts) |
| --- | --- |
| Vinyl Chloride-Vinyl Acetate Co-polymer (VAGH, trade name, made by Union Carbide Co.; vinyl chloride/vinyl acetate/vinyl alcohol = >89/3 to 5/3 to 6) | 10.0 |
| Co-coated γ-Ferric Oxide | 3.0 |
| Butyl Acetate | 58.0 |
| Methyl Ethyl Ketone | 29.0 |

To form each magnetic recording layer, a magnetic orientation of 2,000 gauss was applied with a permanent magnet before drying.

Then, after applying an ordinary subbing treatment to the surface of each support opposite to the magnetic recording layer-carrying side, silver halide emulsion layers having the same formulations as those of Sample 101 described in the example of JP-A-2-44345 were formed on the subbing layer.

Each sample thus obtained was cut to 35 mm in width, such that the imaging portion without the magnetic recording layer was at the central portion and magnetic stripe layers each 4 mm in width were at both of the side portions outside of the imaging portion. Signals of a recording density of 1,000 BPI were recorded on the magnetic stripes using 3 channel magnetic heads capable of recording and reproducing, each having a track width of 0.7 mm and an interval between tracks of 0.7 mm, at a travelling speed of 30 mm/sec.

In addition, each magnetic head had the capability of providing the same performance, the head cap was 1.5 μm, and the turn number was 1,000.

Then, after allowing the resulting samples to stand for 2 weeks under in an atmosphere of 25° C. and 60% RH, an adhesion test was carried out by the following method. In this case, the tested surface was the side having the magnetic recording material (the back surface).

7 notches were formed on the back surface of each sample in a crosswise pattern at an interval of 5 mm to form 36 notched squares. After sticking an adhesive tape (Nitto Tape, trade name, made by Nitto Electric Industrial Co., Ltd.) thereon, the tape was quickly peeled off in a 180° direction.

In the evaluation method, a rank of A was given when at least 90% of the notched squares did not peel, a rank of B was given when 60 to 90% of the notched squares did not peel, and a rank of C was given when less than 60% of the notched squares did not peel. The adhesive strength of a photographic material which is sufficient for practical use is rank A in the foregoing ranking.

Furthermore, an output operation for the magnetically recorded photographic material on the back side by the signal input system disclosed in WO (OPI) 90-04205 was carried out 300 times by magnetic heads, and the number of errors was detected. In addition, after magnetically recording, each color photographic material was processed, and then the output error was also evaluated on the processed sample. The temperature and humidity during the evaluation were 25° C. and 80% RH.

The results of the magnetic output characteristics and the adhesion obtained are shown in Table 1 below.

From the results, it can be seen that the co-extending according to the present invention is superior to the comparison case of employing stripe coating.

Also, when the cross section of the magnetic recording layer of each sample was observed with a microscope, it was confirmed that the section of the sample coated by the stripe coating method became a so-called semi-circular shape, while the cross section of the sample formed by co-flow-extending was nearly rectangular and the surface was completely flat.

EXAMPLE 2

The same procedure as in Example 1 was followed, except that a ferromagnetic metal powder (needle-like particles, specific area 35 m$^2$/g, Hc=920 Oe) prepared from needle-like α-FeOOH containing 5 wt% of cobalt was used as the ferromagnetic powder for dope liquid (b), and dope liquid (a), having the same composition as in Example 1, was sent through liquid sending system c of the die shown in FIGS. 1 and 2 in place of dope liquid (c), which changed the thickness such that the dry thickness of the co-flow-extended stripe layers of dope liquid (a) became the same as that of the co-flow stretched stripe layers of dope liquid (b).

Also, the same procedure as the comparison example in Example 1 was followed, except that the foregoing ferromagnetic metal powder was used for coating composition (c) as the ferromagnetic powder for the stripe coating.

These samples were evaluated as in Example 1, and the results obtained are shown in Table 1 below as No. 3 to No. 8. The results were almost same as those for Example 1.

An examination of the cross section of each sample with a microscope showed that the sample formed by the three layer co-flow-extending method exhibited more of a sharp rectangular form than the sample obtained by co-flow-extending method in Example 1.

As described above, by forming magnetic recording layers using a stripe co-flow-extending method, the flatness of the magnetic recording layers is greatly improved and also the cross sectional shape of the magnetic recording layers becomes nearly a rectangular form. Also, the uneven thickness of each layer in the extending direction becomes less. Thus, it has been confirmed that the photographic support of this invention has uniform magnetic output characteristics and also that the adhesion of the magnetic recording layers which are formed is greatly improved.

TABLE 1

| No. | Stripe Forming System | Content of Ferro-magnetic Material (g/m$^2$) | Adhesion | No. of Magnetic Output Erros | Note |
| --- | --- | --- | --- | --- | --- |
| 1 | Co-flow-extending | 1.7 | A | 2 | Invention |
| 2 | Coating | 1.7 | B | 32 | Comparison |
| 3 | Co-flow-extending | 1.7 | A | 1 | Invention |
| 4 | Coating | 1.7 | B | 24 | Comparison |
| 5 | Co-flow-extending | 3.5 | A | 0 | Invention |
| 6 | Coating | 3.5 | B | 19 | Comparison |
| 7 | Co-flow-extending | 5.0 | A | 0 | Invention |
| 8 | Coating | 5.0 | B | 13 | Comparison |

While the invention has been described in detail and with reference to specific embodiments thereof, it will be apparent to one skilled in the art that various changes and modifications can be made therein without departing from the spirit and scope thereof.

What is claimed is:

1. A process for producing a photographic support in a stripe co-flow-extending die, comprising co-extruding plural dope liquids through a co-flow-extending die having plural manifolds, wherein the cross section of at least one slit connecting a manifold to a liquid joining portion of the die has a comb-like form, wherein the process further comprises sending a dope liquid containing a cellulose ester through a main manifold and sending a dope liquid containing a magnetic substance through a subordinate manifold.

2. A process for producing a photographic support as claimed in claim 1, wherein, a comb-like slit which is connected to a subordinate manifold joins a liquid dining portion between a main manifold and a lip.

3. A process for producing a photographic support as claimed in claim 1, wherein, comb-like slits in a subordinate manifold are not disposed at both ends in a width direction.

4. A process for producing a photographic support comprising co-extruding plural liquids through a co-flow-extending die having at least three manifolds, wherein two manifolds adjacent to each other are subordinate manifolds and have slits arranged in a comb-like cross section, and the comb-like slits join alternately with each other to complete extended layers from the two manifolds, wherein the process further comprises sending a dope liquid containing a cellulose ester through a main manifold and sending a dope liquid containing a magnetic substance through only one of the subordinate manifolds.

5. A process for producing a photographic support as claimed in claim 4, wherein the subordinate manifolds each connect to slits of comb-like cross section which join a liquid joining portion between a main manifold and a lip.

6. A process for producing a photographic support as claimed in claim 4, wherein the comb-like slits of one of the manifolds send a dope liquid containing a magnetic substance and are not disposed at both ends in a width direction.

* * * * *